United States Patent
Luo et al.

(10) Patent No.: US 12,504,840 B2
(45) Date of Patent: Dec. 23, 2025

(54) TOUCHPAD WITH A FORCE-SENSING FUNCTION AND FORCE-SENSING METHOD THEREOF

(71) Applicant: ELAN MICROELECTRONICS CORPORATION, Hsinchu (TW)

(72) Inventors: Hua-I Luo, Taichung (TW); Hsueh-Wei Yang, Zhubei (TW)

(73) Assignee: ELAN MICROELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 18/403,096

(22) Filed: Jan. 3, 2024

(65) Prior Publication Data
US 2024/0241592 A1  Jul. 18, 2024

(30) Foreign Application Priority Data
Jan. 18, 2023 (TW) ................. 112102429

(51) Int. Cl.
*G06F 3/041* (2006.01)

(52) U.S. Cl.
CPC .. *G06F 3/0414* (2013.01); *G06F 2203/04106* (2013.01)

(58) Field of Classification Search
CPC .... G06F 3/04883; G06F 3/0488; G06F 3/016; G06F 3/0482; G06F 3/017; G06F 3/0412; G06F 3/04886; G06F 3/011; G06F 3/041; G06F 3/04842; G06F 2203/04105; G06F 3/0446; G06F 3/0416; G06F 3/044; G06F 3/03545; G06F 3/04166; G06F 3/0445; G06F 3/0414; G06F 3/0443; G06F 3/04186; G06F 2203/04106
See application file for complete search history.

(56) References Cited

U.S. PATENT DOCUMENTS

| | | | |
|---|---|---|---|
| 2011/0080350 A1* | 4/2011 | Almalki | G06F 3/0488 345/173 |
| 2014/0160085 A1* | 6/2014 | Rabii | G06F 3/0418 345/178 |
| 2016/0378222 A1 | 12/2016 | Cheong et al. | |
| 2017/0315658 A1* | 11/2017 | Vandermeijden | G06F 3/04166 |
| 2017/0315669 A1* | 11/2017 | Oh | G06F 3/045 |
| 2021/0011574 A1* | 1/2021 | Micci | G06F 3/0418 |
| 2022/0011915 A1 | 1/2022 | Lee et al. | |
| 2022/0100308 A1 | 3/2022 | Du et al. | |

FOREIGN PATENT DOCUMENTS

TW  202244706 A  11/2022

\* cited by examiner

*Primary Examiner* — Matthew A Eason
*Assistant Examiner* — Sujit Shah
(74) *Attorney, Agent, or Firm* — patenttm.us

(57) ABSTRACT

A touchpad with a force sensing function and force sensing method thereof are disclosed. In the force sensing method, a touch processing unit having a touch sensing procedure and a force reading procedure is provided. When the touch processing unit executes the touch sensing procedure, a force sensor is provided to sense a force applied on a touchpad body and a plurality of force sensing values are obtained. After that, a calculating unit is provided to accumulate the force sensing values to generate a force result. When the touch processing unit executes the force reading procedure, the touch processing unit reads the force result to determine whether a touch procedure is established or not.

14 Claims, 6 Drawing Sheets

(a) PROVIDING THE FORCE SENSOR TO SENSE A FORCE APPLIED ON THE TOUCHPAD TO OBTAIN A PLURALITY OF FORCE SENSING VALUES WHEN THE TOUCH PROCESSING UNIT EXECUTES THE TOUCH SENSING PROCEDURE, AND PROVIDING A CALCULATING UNIT TO ACCUMULATE THE FORCE SENSING VALUES TO GENERATE A FORCE RESULT AND STORE THE FORCE RESULT IN A STORAGE UNIT

(b) PROVIDING THE TOUCH PROCESSING UNIT TO READ THE FORCE RESULT FROM THE STORAGE UNIT WHEN THE TOUCH PROCESSING UNIT EXECUTES THE FORCE READING PROCEDURE, WHEREIN THE FORCE RESULT IS USED TO DETERMINE WHETHER A TOUCH PROCEDURE IS ESTABLISHED OR NOT

FIG.3

TOUCHPAD WITH A FORCE-SENSING FUNCTION AND FORCE-SENSING METHOD THEREOF

CROSS-REFERENCE TO RELATED APPLICATIONS

This application is based upon and claims priority under 35 U.S.C. 119 from Taiwan Patent Application 112102429 filed on Jan. 18, 2023, which is hereby specifically incorporated herein by this reference thereto.

BACKGROUND OF THE INVENTION

1. Field of the Invention

The present invention is related to a touchpad and more particularly to a touchpad with a force-sensing function and a force-sensing method thereof.

2. Description of the Prior Arts

A touchpad is a general input device for most electronic devices and is used to operate and input the electronic device by sensing a position of the user's finger touch on an XY plane thereof. To create more input variety of the touchpad, the touchpad adds a force sensing in the Z-axis direction to determine a downforce of the user's finger. Therefore, more input gestures or other applications are combined.

With reference to FIG. 5, a block diagram of a touchpad 50 with a force-sensing function is shown. The touchpad 50 with force-sensing has a touch processing unit 60, a force processing unit 61 and an external processor 62. The touch processing unit 60 drives and senses a touchpad body 51 to determine a coordinate of an object thereon. The force processing unit 61 is electrically connected to the touch processing unit 60 and a force sensor 52 mounted on the touchpad body 51. The external processor 62 is electrically connected to the touch processing unit 60 and the force processing unit 61.

During the process of sensing the coordinates of the object on the touchpad, the touch processing unit 60 has to sense the downforce of the object applied on the touchpad body 51. Therefore, the force processing unit 61 receives a force sensing signal from the force sensor 52. With further reference to FIG. 6, in a preset sampling period, the force sensing signal is sampled with a fixed sampling frequency as a plurality of force sensing data d1 to d6. When each of force sensing data is obtained, the force sensing data is stored in a signal register 611 of the force processing unit 61. That is, after the next one of the force sensing data is obtained, it will be still stored in the same register 611 to overwrite the previously-stored force sensing data. In detail, when a first force sensing data d1 is obtained, it will be stored in the register 611. When a second force sensing data d2 is obtained, the second force sensing data d2 will be stored in the same single register 611 as well and overwrites the first force sensing data d1. Therefore, the single register 611 only stores the second force sensing data d2 now. When one of the sampling periods is ended, the single register 611 only stores a final force sensing data d6. When a next force sensing data is obtained by the force processing unit 61, the touch processing unit 60 can not read the previously-stored force sensing data in the single register in time since the touch processing unit 60 is sensing the object on the touchpad. To avoid that the previously-stored force sensing data in the single register is overwritten before it is read by the touch processing unit 60, the plurality of the force sensing data d1 to d6 can be read and stored by the external processor 62 and the external processor 62 works with the sampling frequency of the force processing unit 61 in this period. After the touch processing unit 60 ends the object sensing, the touch processing unit 60 reads the force sensing data d1 to d6 from the external processor 62 in sequence and calculates a slope ($\Delta$) between each of two adjacent force sensing data d1/d2, d2/d3, d3/d4, d4/d5, d5/d6. Then, the touch processing unit 60 takes an average of the slopes as a final force result.

In general, a sampling period is defined within a rising trend of the force sensing signal, so ideally all of the slopes calculated based on the sampled force sensing data should be positive. However, with reference to FIG. 6, the force sensing data d2, d4, d5 are sampled at falling times of the ripple signals when a plurality of ripple signals occurs in the rising trend of the force sensing signal, the sampled force sensing data d2, d4, d5 are lower than the previously-sampled force sensing data d1, d3, d4. Thus, the slopes d1/d2, d3/d4, d4/d5 calculated according to the force sensing data d2, d4, d5 are negative ($-\Delta$). Therefore, even the sampling period is defined within the rising trend of the force sensing signal, some of the slopes are negative. The touch processing unit 60 may determine the object does not apply the force according to the average of the slopes, which is not greater than a threshold. The touch processing unit 60 incorrectly determines that the object does not apply the force because of the negative slopes caused by the ripple signals.

To overcome the shortcomings, the present invention provides a touchpad with force-sensing and force-sensing method thereof to mitigate or to obviate the aforementioned problems.

SUMMARY

An objective of the present invention is to provide a touchpad with force-sensing and force-sensing method thereof to accurately determine the force applied on the touchpad.

The force-sensing method of a touchpad, which has a touch processing unit and a force sensor and the touch processing unit has a touch sensing procedure and a force reading procedure, has following steps of:
(a) sensing a force applied on the touchpad through the force sensor to obtain a plurality of force sensing values when the touch processing unit executes the touch sensing procedure, and accumulating the force sensing values by a calculating unit to generate a force result and store the force result in a storage unit; and
(b) reading the force result from the storage unit through the touch processing unit when the touch processing unit executes the force reading procedure, wherein the force result is used to determine whether a touch procedure is established or not.

Based on the foregoing description, the force sensing method of the present invention mainly uses the force sensor to obtain a plurality of force sensing values corresponding to the downforce on the touchpad when the touch processing unit executes the touch sensing procedure to sense an object on the touchpad. In addition, the calculating unit accumulate the force sensing values to generate the force result. After that, the touch processing unit executes the force reading procedure to read the force result for determining whether a touch procedure is established or not.

The touchpad with force-sensing has:
a touchpad body having a plurality of touch sensing elements and at least one force sensor;
a touch processing unit having a touch sensing procedure and a force reading procedure;
a reading unit electrically connected to the touch processing unit and the at least one force sensor, wherein the reading unit has a storage unit; and
a calculating unit electrically connected to the storage unit of the reading unit, wherein
when the touch processing unit executes the touch sensing procedure, the reading unit obtains a plurality of force sensing values from the least one force sensor, and the calculating unit accumulates the force sensing values to generate a force result and stores the force result in the storage unit; and
when the touch processing unit executes the force reading procedure, the touch processing unit reads the force result from the storage unit, wherein the force result is used to determine whether a touch procedure is established or not.

Based on the foregoing description, the touchpad with a force sensing function of the present invention mainly uses the reading unit to obtain a plurality force sensing values corresponding to force applied on the touchpad body when the touch processing unit executes the touch sensing procedure to sense an object on the touchpad body. The calculating unit accumulates the force sensing values to generate the force result and then stores the force result in the storage unit. When the touch processing unit executes the force reading procedure, the force result is read from the storage to determine whether the touch procedure is established or not.

Other objectives, advantages and novel features of the invention will become more apparent from the following detailed description when taken in conjunction with the accompanying drawings.

BRIEF DESCRIPTION OF THE DRAWINGS

FIG. 3 is a flow chart of a force sensing method of the touchpad in accordance with the present invention;

DETAILED DESCRIPTION OF THE EMBODIMENTS

Figure 1:
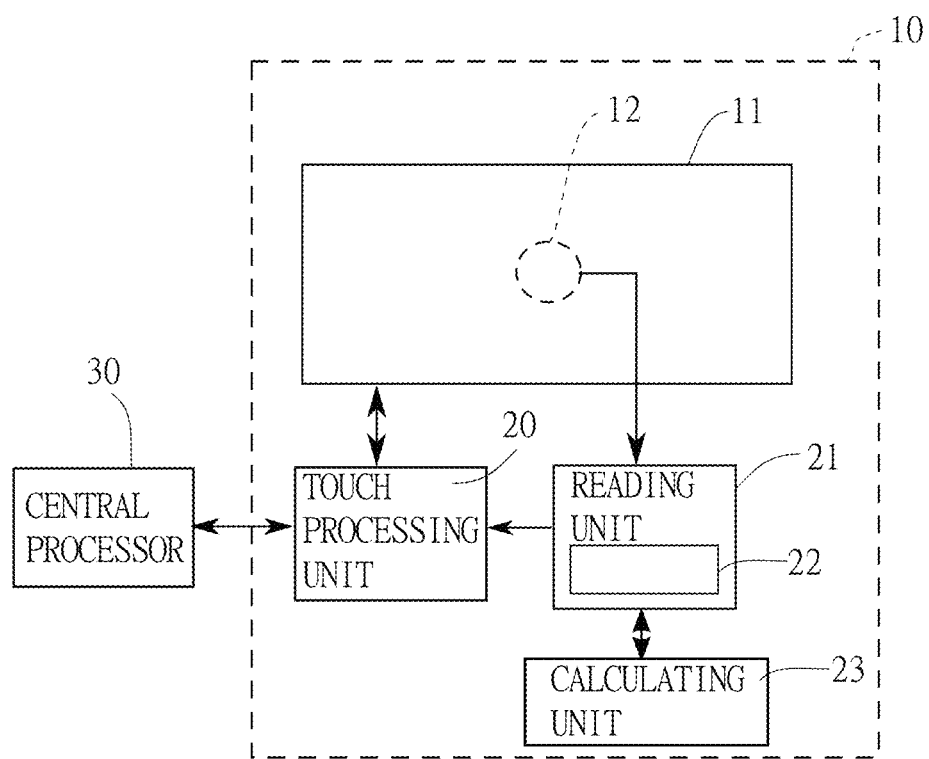
FIG. 1 is a functional block diagram of one embodiment of a touchpad with a force sensing function in accordance with the present invention.

With reference to FIG. 1, a functional block diagram of a touchpad with a force sensing function in accordance with the present invention is shown. The touchpad 10 has a touchpad body 11, at least one force sensor 12, a touch processing unit 20, a reading unit 21 and a calculating unit 23. A plurality of touch sensing elements (not shown in FIG. 1) are disposed on the touchpad body 11. The touch sensing elements may be mounted on a side of the touchpad body 11 to sense capacitance changes caused by an object. The at least one force sensor 12 is mounted in the touchpad body 11 to sense a force applied on the touchpad body 11 and to output a force sensing signal corresponding to the force. In one embodiment, the force sensor 12 may be a piezoelectric sensor, but not limited to.

With further reference to FIG. 3, in a force sensing method of the touchpad 10 of the present invention, the touch processing unit 20 has a touch sensing procedure and a force reading procedure. The force sensing method has steps (a) and (b).

In the step (a), when the touch processing unit 20 executes the touch sensing procedure, the force sensor 12 senses the force applied on the touchpad body 11 to obtain a plurality of force sensing values. The calculating unit 23 further accumulates the force sensing values to generate a force result and then stores the force result in the storage unit 22. The storage unit 22 may be built in the reading unit 21 or an individual storage unit. In one embodiment, the reading unit 21 may further provide the calculating unit 23 with the force sensing values in sequence. Therefore, the calculating unit 23 generates the force result by accumulating the force sensing values and then stores the force result in the storage unit 22. In another embodiment, after a first force sensing value is stored in the storage unit 22, the calculating unit 23 reads the first force sensing value from the storage unit 22. When the calculating unit 23 obtains a second force sensing value, the calculating unit 23 accumulates the first and second force sensing values to generate a first accumulated value and then stores the first accumulated value in the storage unit 22 to overwrite the first force sensing value stored in the storage unit 22. These tasks are repeated until the last force sensing value is accumulated, and a final accumulated value is used as the force result.

Figure 4A:
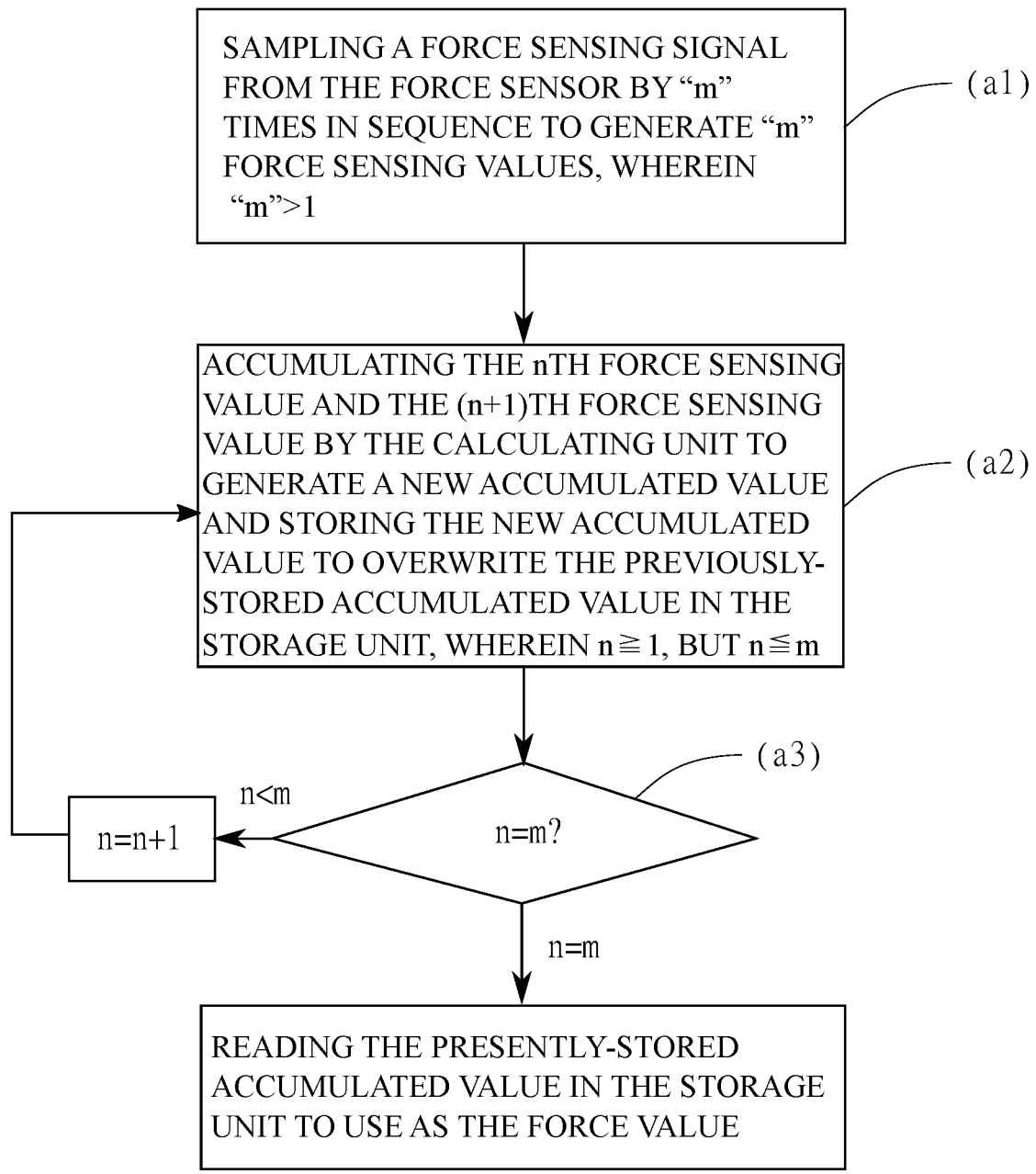
FIG. 4A is a flow chart of generating a force result in accordance with the present invention.

The calculating unit 23 obtains the force sensing values in sequence to accumulate the force sensing values. As shown in FIG. 4A, in one embodiment, a way of generating the force value further has steps (a1) to (a3).

In the step (a1), a force sensing signal from the force sensor 12 is sampled by "m" times in sequence to generate "m" force sensing values, wherein m>1.

In the step (a2), the calculating unit 23 accumulates the $n^{th}$ force sensing value and the (n+1)th force sensing value to generate a new accumulated value and stores the new accumulated value to overwrite the previously-stored accumulated value in the storage unit 22, wherein n≥1, but n≤m.

In the step (a3), the "n" is further determined whether "n" is equal to "m". If not, go to the step (a2), but if yes, the touch processing unit 20 reads the presently-stored accumulated value in the storage unit 22 to use as the force result.

Figure 4B:
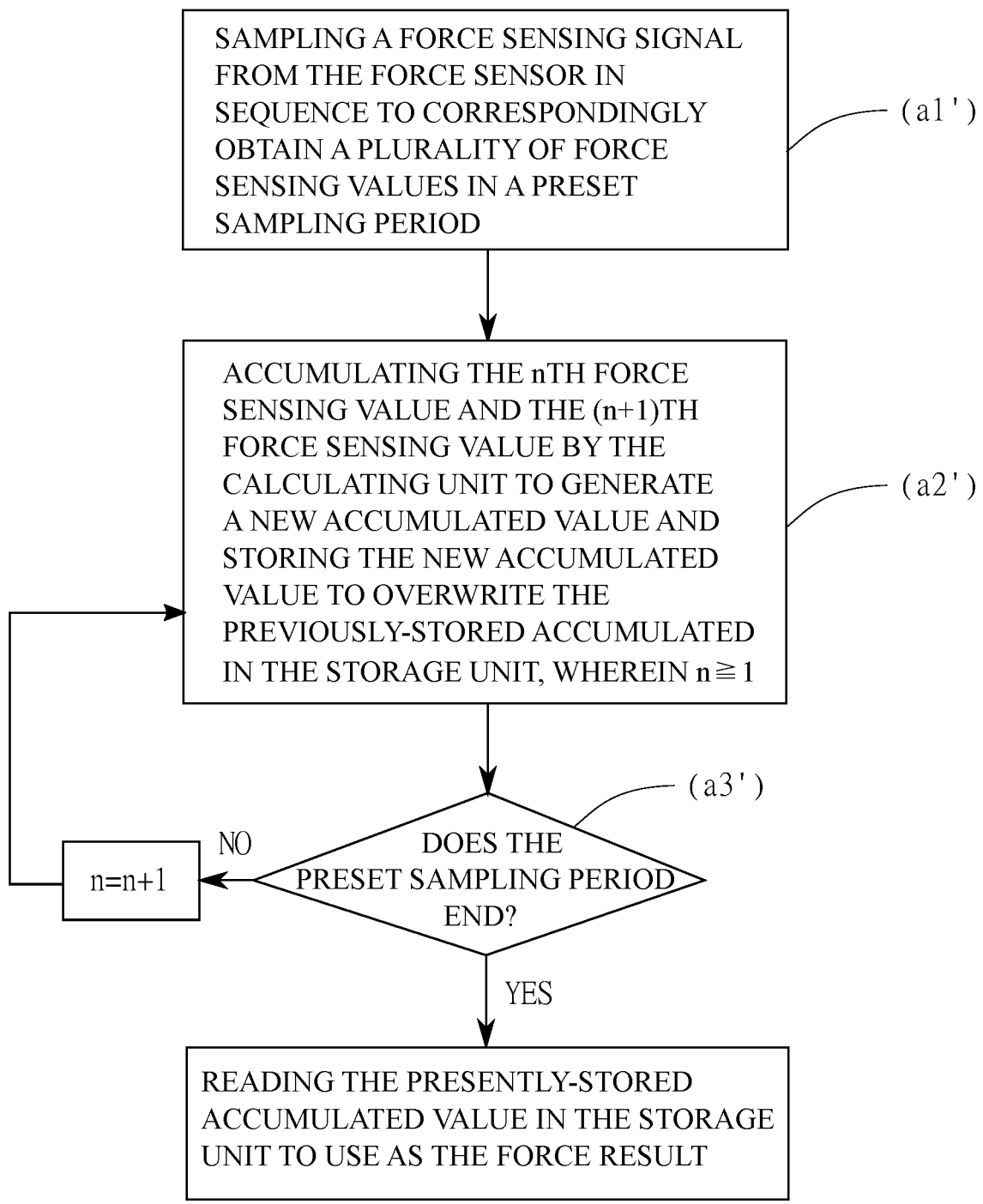
FIG. 4B is another flow chart of generating a force result in accordance with the present invention.
Figure 5:
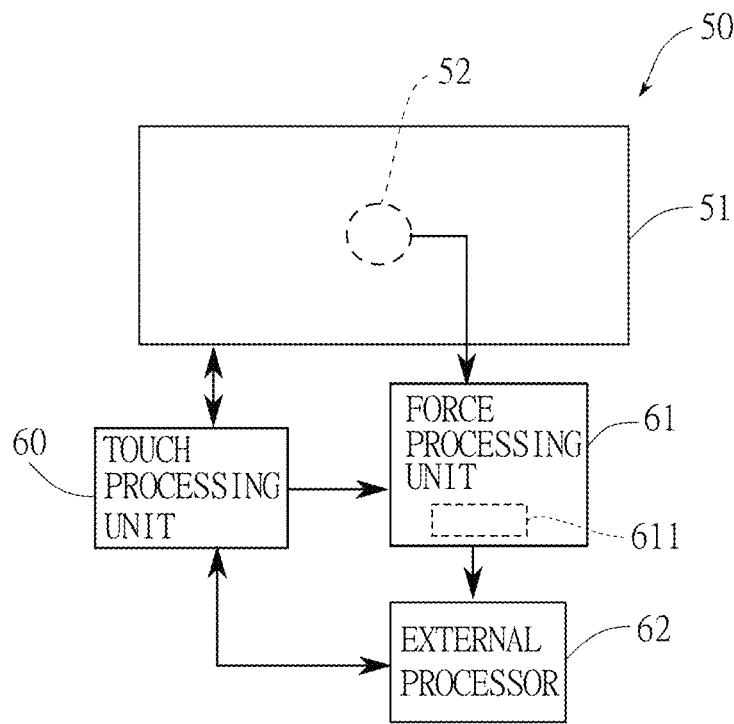
FIG. 5 is a functional block diagram of a conventional touchpad in accordance with the prior art.
Figure 6:
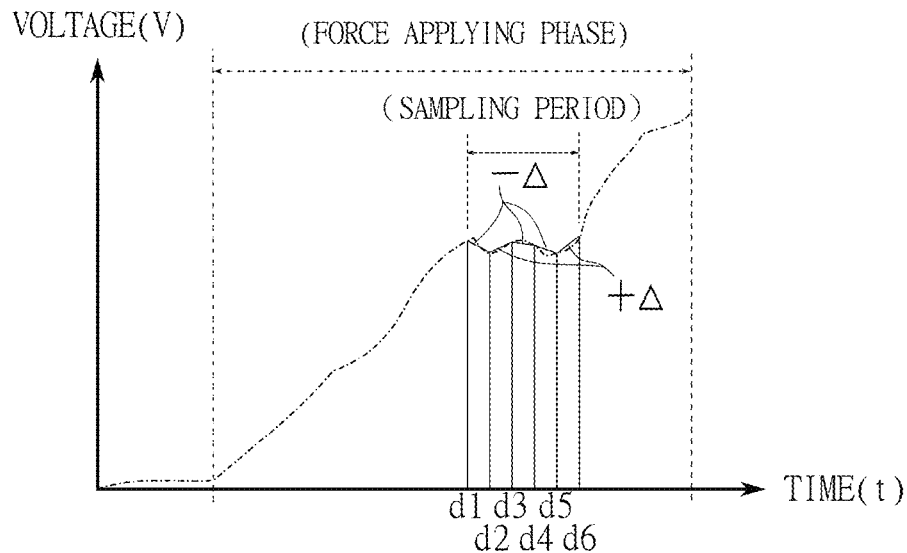
FIG. 6 is a voltage waveform diagram of a force sensing signal from a force sensor of the conventional touchpad in accordance with the prior art.

As shown in FIG. 4B, another embodiment of a way of generating the force value further has step (a1') to (a3').

In the step (a1'), a force sensing signal from the force sensor 12 is sampled in sequence to correspondingly generate a plurality of force sensing values in a preset sampling period.

In the step (a2'), the calculating unit 23 accumulates the nth force sensing value and the (n+1)th force sensing value to generate a new accumulated value and stores the new accumulated value to overwrite the previously-stored accumulated value in the storage unit 22, wherein n≥1.

In the step (a3'), go to step (a2') if the preset sampling period is not ended yet, but the touch processing unit 20 reads the presently-stored accumulated value in the storage unit 22 to use as the force result if the preset sampling period is ended.

The step (b) will be executed after the accumulated value is generated in the step (a). In the step (b), the touch processing unit 20 reads the force result from the storage unit 22 in a blank time segment, and the force result is used to determine whether the touch procedure is established or not. The touch processing unit 20 may independently determine whether the touch procedure is established or a central processor 30 determines whether the touch procedure is established after the touch processing unit 20 sends the force result to the central processor 30.

When the force sensing method of the present invention is applied to the touchpad, the touchpad body 11 can further provide a function of press-vibration feedback. To implement the function of press-vibration feedback, an actuator may be mounted on the touchpad body 11, or a piezoelectric element is used as the force sensor 12. If the touch procedure is determined to be established in the step (b), a press gesture like "Click" is identified. At the time, the touch processing unit 20 further drives the force sensor 12 or the actuator to vibrate the touchpad body 11 and the user's finger can feel vibration feedback. In one embodiment, the actuator may be a motor or the like. Therefore, when the touch processing unit 20 determines or is notified that the touch procedure is established, the touch processing unit 20 may further directly or indirectly drive the actuator to provide the vibration feedback.

With reference to FIG. 1, the touch processing unit 20 is further electrically connected to the touch sensing elements of the touchpad body 11 and the reading unit 21, and has the touch sensing procedure and the force reading procedure. When the touch processing unit 20 executes the touch sensing procedure, the touchpad body 11 is driven and sensed by the touch processing unit 20, and then the touch processing unit 20 identifies an object on the touchpad and a coordinate of the object. In particular, the touch processing unit 20 presets a touch execution period having a touch sensing time segment and a blank time segment. The touch processing unit 20 executes the touch sensing procedure in the touch sensing time segment to drive and sense the touchpad body 11.

The reading unit 21 has a storage unit 22 and is electrically connected to the force sensor 12 to receive at least one force sensing signal. In another embodiment, as shown in FIG. 2, the reading unit 21 may be further electrically connected to a plurality of the force sensors 12, and the storage unit 12 has a plurality of registers corresponding to the force sensors.

When the touch processing unit 20 executes the touch sensing procedure to drive and sense the touchpad body 11, the reading unit 21 samples the force sensing signal of the at least one force sensor 12 to convert the force sensing signals to a plurality of force sensing values at the same time. Then the calculating unit 23 accumulates the force sensing values from the receiving unit 21 to generate a force result. In one embodiment, the calculating unit 23 may be built in the reading unit 21 and may be an integrator or accumulator. The calculating unit 23 sequentially receives the force sensing values corresponding force sensing signal from each force sensor 12 through the reading unit 21. After that, the calculating unit 23 accumulates the force sensing values to generate an accumulated value and stores the accumulated value in the storage unit 22. In addition, the calculating unit 23 may be a microprocessor electrically connected to the at least one force sensor 12 and the storage unit 22. After the microprocessor reads the force sensing value sensed by the force sensor 12 through the reading unit 21, the microprocessor accumulates the previously-read force sensing value and the presently-stored accumulated value in the storage unit 22 to generate a new accumulated value. The new accumulated value is stored in the storage unit 22.

Figure 2:
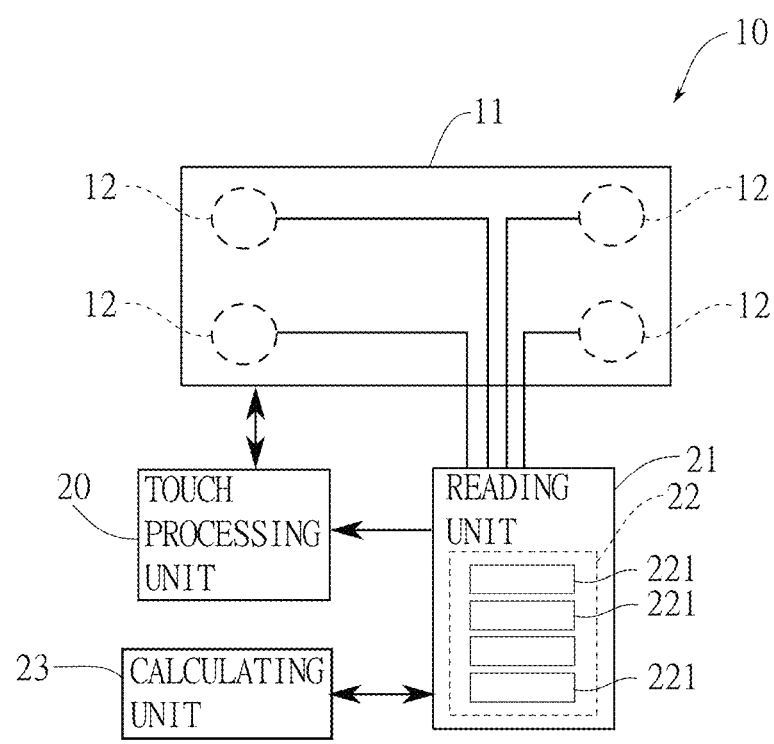
FIG. 2 is a functional block diagram of another embodiment of a touchpad with a force sensing function in accordance with the present invention.

In one embodiment, as shown in FIG. 2, when the reading unit 21 is electrically connected to a plurality of the force sensors 12, the reading unit 21 samples each force sensing signal, and a plurality of the force sensing signals are converted to a plurality of force sensing values. The force sensing values from the different force sensors 12 are respectively stored in corresponding registers 21. For example, if a first to fourth force sensors 12 are disposed on the touchpad body 11, the storage unit 22 also has a first to fourth registers 221 respectively and correspondingly connected to the first to fourth force sensors 12. The first register 221 stores the force sensing value from the first force sensor 12 and the force result. The second register 221 stores the force sensing value from the second force sensor 12 and the force result. The third register 221 stores the force sensing value from the third force sensor 12 and the force result. The fourth register 221 stores the force sensing value from the fourth force sensor 12 and the force result. Therefore, when the touch processing unit 20 executes the force reading procedure to read the force result from the least one of the first to fourth registers 221, the touch processing unit 20 determines whether the touch procedure is established or not according to the force result. In one embodiment, the touch processing unit 20 executes the force reading procedure in the blank time segment.

Based on the foregoing description, when the touch processing unit as described executes the touch sensing procedure to identify an object on the touchpad body, the reading unit obtains a plurality of force sensing values corresponding to a force applied on the touchpad body and the calculating unit accumulates the force sensing values to generate an accurate force result. Furthermore, since the reading unit obtains the force sensing values from different force sensors in each sensing period and the calculating unit sequentially accumulates the force sensing values to generate an accumulated value for each force sensor and stores the accumulated value in the corresponding register of the storage unit, the touch processing unit directly reads the force result from the registers of the reading unit during executing the force reading procedure. Therefore, the touchpad as described does not require an external processor to immediately process the steps of storing and determining when each force sensing value is obtained, thus the situation that a next force sensing value overwrites the previously-stored force sensing value can be avoided. Thus, the touchpad as described effectively simplifies the touchpad and further reduces the hardware cost while improving the sensing accuracy.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A force sensing method of a touchpad, wherein the touchpad has a touch processing unit, a force sensor, a calculating unit and a reading unit electrically connected to the touch processing unit, the force sensor and the calculating unit and having a storage unit, the touch processing unit is electrically connected to a central processor and the calculating unit, the touch processing unit has a touch sensing procedure and a force reading procedure and presets a touch execution period having a touch sensing time segment and a blank time segment, wherein the force sensing method comprises steps of:

(a) during the touch sensing time segment of the touch execution period, sampling a force sensing signal from the force sensor in sequence to correspondingly obtain a plurality of force sensing values; when the touch processing unit executes the touch sensing procedure to drive and sense a touchpad body and identify an object on the touchpad body; and accumulating the nth force sensing value and the (n+1)th force sensing value by the calculating unit to generate a new accumulated value and storing the new accumulated value in the storage unit to overwrite the previously-stored accumulated value until a last one of the force sensing value is accumulated, wherein a finally-accumulated value is used as a force result in the storage unit of the reading unit, wherein n≥1; and (b) during the blank time segment of the touch execution period, reading the force result from the storage unit of the reading unit through the touch processing unit when the touch processing unit executes the force reading procedure, wherein the force result is used to determine whether a touch procedure is established or not by the touch processing unit or the central processor.

2. The force sensing method as claimed in claim 1, wherein in the step (a), a way of generating the force result has steps of:

(a1) presetting a number of sampling time "m" and "m">1;

(a2) sampling the force sensing signal from the force sensor by "m" times in sequence to obtain the "m" force sensing values;

(a3) accumulating the nth force sensing value and the (n+1)th force the new accumulated value sensing value by the calculating unit to generate and storing the new accumulated value to overwrite the previously-stored accumulated value in the storage unit, wherein n≤m; and (a4) determining whether "n" is equal to "m", wherein if not, go to the step (a3), but if yes, the touch processing unit reads the finally-stored accumulated value in the storage unit to use as the force result.

3. The force sensing method as claimed in claim 1, wherein in the step (a), a way of generating the force result has steps of:

(a1) presetting a sampling period;

(a2) sampling the force sensing signal from the force sensor in sequence to correspondingly obtain the force sensing values in the sampling period;

(a3) accumulating the nth force sensing value and the (n+1)th force sensing value by the calculating unit to generate the new accumulated value and storing the new accumulated value to overwrite the previously-stored accumulated value in the storage unit; and (a3) executing the step (a3) if the sampling period is not ended yet, but reading the presently-stored accumulated value in the storage unit through the touch processing unit to use as the force result if the preset sampling period is ended.

4. The force sensing method as claimed in claim 1, wherein in the step (b), the touch processing unit independently determines whether the touch procedure is established or not according to the force result.

5. The force sensing method as claimed in claim 1, wherein in the step (b), the force result is sent to the central processor and the central processor determines whether the touch procedure is established or not according to the force result.

6. The force sensing method as claimed in claim 4, wherein when the touch processing unit independently determines that the touch procedure is established, the touch processing unit drives the force sensor or an actuator to vibrate.

7. The force sensing method as claimed in claim 5, wherein when the touch processing unit is notified that the touch procedure is established by the central processor, the touch processing unit drives the force sensor or an actuator to vibrate.

8. A touchpad with a force sensing function comprising:

a touchpad body having a plurality of touch sensing elements and at least one force sensor;

a touch processing unit electrically connected to a central processor, having a touch sensing procedure and a force reading procedure, and presetting a touch execution period having a touch sensing time segment and a blank time segment;

a reading unit electrically connected to the touch processing unit and the at least one force sensor, wherein the reading unit has a storage unit; and a calculating unit electrically connected to the touch processing unit and the storage unit of the reading unit, wherein when the touch processing unit executes the touch sensing procedure to drive and sense the touchpad body and identify an object on the touchpad body during the touch sensing time segment of the touch execution period, the reading unit samples a force sensing signal from the force sensor in sequence to correspondingly obtain a plurality of force sensing values and the calculating unit accumulates the nth force sensing value and the (n+1)th force sensing value to generate a new accumulated value and stores the new accumulated value in the storage unit to overwrite the previously-stored accumulated value until a last one of the force sensing value is accumulated, wherein a finally-accumulated value is used as a force result in the storage unit of the reading unit, wherein n≥1; and when the touch processing unit executes the force reading procedure during the blank time segment of the touch execution period, the touch processing unit reads the force result from the storage unit of the reading unit, wherein the force result is used to determine whether a touch procedure is established or not by the touch processing unit or the central processor.

9. The touchpad with a force sensing function as claimed in claim 8, wherein the calculating unit is built in the reading unit and is an integrator or accumulator;

the calculating unit is electrically connected to the least one force sensor and the storage unit; and the calculating unit sequentially receives the force sensing values sensed by the at least one force sensor through the reading unit, and then the calculating unit accumulates the force sensing values to generate the accumulated value and stores the accumulated value in the storage unit.

10. The touchpad with a force sensing function as claimed in claim 8, wherein
the calculating unit is a microprocessor;
the microprocessor is electrically connected to the least one force sensor and the storage unit; and
the microprocessor receives the force sensing value sensed by the at least one force sensor through the reading unit, and then the microprocessor accumulates the force sensing value and a previously-stored accumulated value in the storage unit to generate a new accumulated value and stores the new accumulated value in the storage unit.

11. The touchpad with a force sensing function as claimed in claim 8, wherein
a first force sensor is disposed on the touchpad body; and
the storage unit has a first register electrically connected to the first force sensor, wherein the first register stores the force sensing value sensed by the first force sensor and the force result.

12. The touchpad with a force sensing function as claimed in claim 11, wherein
a second force sensor is disposed on the touchpad body; and
the storage unit has a second register electrically connected to the second force sensor, wherein the second register stores the force sensing value sensed by the second force sensor and the force result.

13. The touchpad with a force sensing function as claimed in claim 12, wherein after the touch processing unit reads the force result from at least one of the first and second registers in the blank time segment, the touch processing unit determines that the touch procedure is established according to the force result.

14. The touchpad with a force sensing function as claimed in claim 12, wherein after the touch processing unit reads the force result from at least one of the first and second registers in the blank time segment, the touch processing unit sends the force result to the central processor and the central processor determines that the touch procedure is established according to the force result.

* * * * *